Patented Oct. 10, 1950

2,525,671

UNITED STATES PATENT OFFICE 2,525,671

CARNAUBA WAX AS SLIP AGENT FOR VINYLIDENE CHLORIDE - ACRYLONITRILE COPOLYMER FILMS

Paul Matthew Hauser, Kenmore, N. Y., assignor to E. I. du Pont de Nemours & Company, Wilmington, Del., a corporation of Delaware No Drawing. Application November 29, 1946, Serial No. 713,083

8 Claims. (Cl. 260—28.5)

This invention relates to the manufacture of film structures. More particularly, it relates to improved coatings and self-sustaining film of vinylidene chloride copolymers.

Coatings of organic solvent-soluble vinylidene chloride copolymers e. g., vinylidene chloride-acrylonitrile copolymers, are colorless, transparent, flexible, strong, durable, stable, non-tacky, heat-sealable, and inherently moistureproof, and constitute superior protective coatings, particularly for regenerate cellulose base film and the like now largely employed as wrapping tissue. These copolymers may also be cast, by conventional methods, to form self-sustaining film which by reason of the advantageous characteristics recited hereinabove is widely useful. However coatings and film of vinylidene chloride and like copolymers suffer from a lack of "slip," that is, the film-to-film and film-to-metal coefficient of friction is high. This is a serious handicap in the wrapping tissue art because it results in jamming of automatic wrapping machines and difficulty in removing sheets of the wrapping tissue singly from a stack of the same.

Therefore, a principal object of this invention is to improve the slip characteristics of coatings and self-sustaining film of vinylidene chloride copolymers.

Another object is to improve slip characteristics of coatings and self-sustaining film of vinylidene chloride-acrylonitrile copolymers without in any degree impairing the transparency, durability, moistureproofness, heat-sealability and other desirable properties of the coating or film.

Still another object is to enhance the slip characteristics of coatings and film of vinylidene chloride-acrylonitrile copolymers over a wide range of temperature.

A further object is to promote slip, that is, reduce the film-to-film and film-to-metal coefficient of friction of films of vinylidene chloride-acrylonitrile copolymer, without adversely affecting the physical appearance of the films. These and other objects will more clearly appear hereinafter.

I have found that natural and synthetic ester type waxes constitute excellent slip agents (i. e agents for promoting slip) for vinylidene chloride copolymer film and especially for vinylidene chloride-acrylonitrile copolymer coatings and self-sustaining film. This is indeed surprising because the usual slip agents such as talc, kaolin, ground bentonite, zinc oxide, and waxy substances such as polythene wax, paraffin wax, stearone, etc., heretofore successfully employed to impart slip to the conventional moistureproofing coating comprising essentially a cellulose film-former( e. g. nitrocellulose) and a moistureproofing wax are ineffective with vinylidene chloride-acrylonitrile copolymer coatings.

The objects hereinabove enumerated are therefore accomplished by incorporating in the copolymer composition, e. g., vinylidene chloride-acrylonitrile copolymer coating or casting composition, a relatively small proportion of an ester type wax and thereafter forming the coating or self-sustaining film by any of the known expedients.

Any ester type wax, either natural or synthetic is suitable for purposes of this invention. As examples of natural waxes which are effective there may be mentioned carnauba, spermac, candelilla and palm waxes. Effective synthetic waxes are "Opal wax" (hydrogenated castor oil), benzyl stearate, pentaerythritol distearate, pentaerythritol tetra stearate, stearyl stearate, etc. The amount of wax used may vary over a wide range and will depend to some extent on the specific wax employed, the thickness of the coating or film, and the degree of slipperiness desired. Optimum concentrations lie between about 0.1 and about 3.0% by weight based on the weight of solids in the composition. For carnauba wax, which is the preferred species of ester type wax, the optimum cencentration lies between about 0.1 and about 1.0% by weight of solids.

The slip agents of this invention are effective with any vinylidene chloride copolymer capable of forming a film. Examples of suitable copolymers are those of vinylidene chloride with acrylonitrile, with vinyl chloride, with vinyl acetate, with methyl vinyl ketone, with butyl methacrylate, as well as copolymers of vinylidene chloride with any combination of these copolymerizable materials. However, because of their superior moistureproofness vinylidene chloride-acrylonitrile copolymers containing at least 80% of vinylidene chloride have proven most satisfactory. The preparation of vinylidene chloride-acrylonitrile copolymers in general is disclosed in United States Patent No. 2,278,415 (Arnold). The preparation of vinylidene chloride-acrylonitrile copolymers containing in excess of 80% vinylidene chloride and soluble in organic solvents, e. g., methyl ethyl ketone, is described and claimed in United States patent application of Chester R. Hardt, Serial No. 605,185, filed July 14, 1945, now abandoned.

The coating may be applied to the base material from a suitable solution or dispersion by any desired technique such as by spraying, brushing, roll application, etc. Likewise self-supporting film may be cast from a suitable solution or dispersion of the copolymer and slip agent in the conventional manner.

As coatings, vinylidene chloride-acrylonitrile copolymers probably have their most important application in the moistureproofing of regenerated cellulose film and like water-sensitive films used as wrapping tissue, and this invention will be further described with particular reference to such application.

The following examples, wherein are set forth specific embodiments, will further illustrate the principles and practice of this invention. Parts and percentages are by weight unless otherwise indicated.

Example I

A sheet of 350 gauge regenerated cellulose film containing 22% glycerol was coated with a subcoat composition consisting of:

| | Per cent |
|---|---|
| 5% solids as follows: | |
| Melaic acid | 10 |
| Melamine formaldehyde, n-butanol resin | 25 |
| Nitrocellulose (11.6% N) | 65 |
| Solvent as follows: | |
| Toluene | 35 |
| n-Butanol | 10 |
| Ethyl acetate | 55 | to the extent of 1 gram of solids per square meter of film, and dried at 120° C. for 40 seconds. The resulting coated sheet was thereafter topcoated with a composition consisting of:

| | Per cent |
|---|---|
| 15% solids as follows: | |
| 80:20 vinylidene chloride-acrylonitrile copolymer | 99.5 |
| Carnauba wax | 0.5 |
| Solvent as follows: | |
| Toluene | 10 |
| Methyl ethyl ketone | 90 | to a thickness of 8 grams of solids per square meter of film, and dried (solvent removed) at 130° C. for 100 seconds.

The resulting film was transparent, slippery to the touch, and operated on automatic packaging machines without jamming. A similar film differing only in that it contained no carnauba wax could not be handled in the automatic packaging machines without jamming.

Example II

Three hundred and fifty (350) gauge regenerated cellulose film containing 22% glycerol was subcoated as in the preceding example and was thereafter topcoated, as in Example I, with a composition consisting of:

| | Per cent |
|---|---|
| 15% solids as follows: | |
| 80:20 vinylidene chloride-acrylonitrile copolymer | 97 |
| Hydrogenated castor oil | 3 |
| Solvent as follows: | |
| Toluene | 10 |
| Methyl ethyl ketone | 90 |

The resulting dry film was transparent, slippery to the touch, and did not jam when used in automatic packaging machines.

Example III

Four hundred and fifty (450) gauge regenerated cellulose film containing 24% glycerol was coated at the rate of 8 grams of solids per square meter of film, with a composition consisting of:

| | Per cent |
|---|---|
| 20% solids as follows: | |
| 80:20 vinylidene chloride-methyl vinyl ketone copolymer | 99.5 |
| Spermaceti wax | 0.5 |
| Solvent as follows: | |
| Methyl ethyl ketone | 100 |

There resulted a transparent film, slippery to the touch. Film containing no spermaceti wax but otherwise identical was not slippery.

Example IV

A composition consisting of:

| | Per cent |
|---|---|
| 20% solids as follows: | |
| 80:20 vinylidene chloride-acrylonitrile copolymer | 99.7 |
| Spermaceti wax | 0.3 | dissolved in methyl ethyl ketone was deposited as a film of 1 mil thickness on a glass plate and dried for 1 hour at 90° C. The air side of the resulting self-sustaining film was slippery but the plate side was not. Hanging the film stripped from the plate, in air at 90° C. for 1 minute produced a slippery surface on the plate side as well.

From the above it will be evident that this invention eliminates a serious obstacle in the use of vinylidene chloride-copolymer coatings and self-sustaining film by imparting the surface slip essential to handling and manipulating coated sheets and film in automatic wrapping machines.

Since the invention is subject to numerous obvious modifications and variations from the details hereinabove described without departing from the spirit and scope thereof, it is to be understood that the invention is not to be limited except as defined in the appended claims.

I claim:

1. A moistureproof, heat-sealable wrapping tissue comprising regenerated cellulose film coated with a composition comprising essentially vinylidene chloride-acrylonitrile copolymer as the sole film-former, and from 0.1 to 3.0% by weight of an ester wax as a slip-promoting agent.

2. A film comprising essentially vinylidene chloride-acrylonitrile copolymer as the sole film-former, and from 0.1 to 3.0% by weight of carnauba wax as a slip-promoting agent.

3. A film comprising essentially vinylidene chloride-acrylonitrile copolymer and from 0.1 to 3.0% by weight of an ester wax.

4. A film comprising essentially vinylidene chloride-acrylonitrile copolymer as the sole film-former, and from 0.1 to 3.0% by weight of an ester wax, said copolymer containing at least 80% vinylidene chloride.

5. A film comprising essentially vinylidene chloride-acrylonitrile copolymer as the sole film-former, and from 0.1 to 1.0% by weight of carnauba wax, said polymer containing at least 80% vinylidene chloride.

6. A moistureproof, heat-sealable wrapping tissue comprising regenerated cellulose coated with coating composition comprising vinylidene chloride-acrylonitrile copolymer as the sole film-former, and from 0.1 to 1.0% by weight, based on the weight of solids in the coating composition, of carnauba wax, said copolymer containing at least 80% vinylidene chloride.

7. A film-forming composition comprising essentially an organic solvent solution of vinylidene chloride-acrylonitrile copolymer as the sole film-former, and from 0.1 to 3.0% by weight, based on the weight of solids in said composition, of an ester wax, said copolymer containing at least 80% vinylidene chloride.

8. A film-forming composition comprising essentially vinylidene chloride-acrylonitrile copolymer as the sole film-former, and from 0.1 to 1.0% by weight, based on the weight of solids, of carnauba wax dissolved in methyl ethyl ketone, said copolymer containing at least 80% vinylidene chloride.

PAUL MATTHEW HAUSER.

REFERENCES CITED

The following references are of record in the file of this patent:

UNITED STATES PATENTS

| Number | Name | Date |
| --- | --- | --- |
| 2,085,816 | Meigs | July 6, 1937 |
| 2,238,020 | Hanson et al. | Apr. 8, 1941 |
| 2,334,236 | Arnold et al. | Nov. 16, 1943 |
| 2,360,947 | Hershberger | Oct. 24, 1944 |